(No Model.) 3 Sheets—Sheet 1.

J. HOWARD.
CAR BRAKE ADJUSTER.

No. 537,574. Patented Apr. 16, 1895.

WITNESSES
Emil Neukart
Chas. F. Burkhardt

James Howard
By Wilhelm & Bonner

INVENTOR

ATTORNEYS

THE NORRIS PETERS CO., PHOTO-LITHO., WASHINGTON, D. C.

(No Model.)   J. HOWARD.   3 Sheets—Sheet 2.
CAR BRAKE ADJUSTER.
No. 537,574.   Patented Apr. 16, 1895.
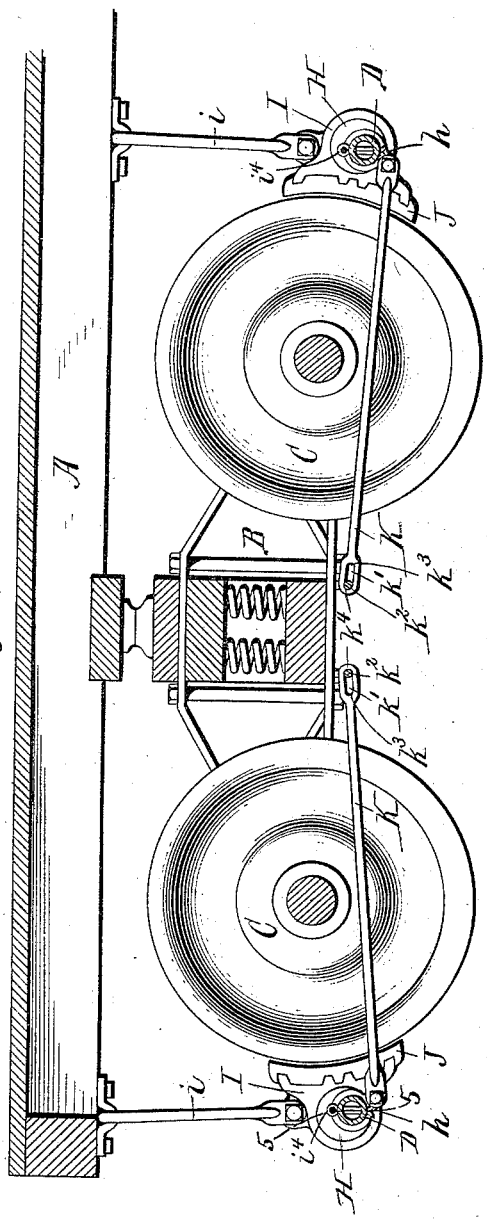
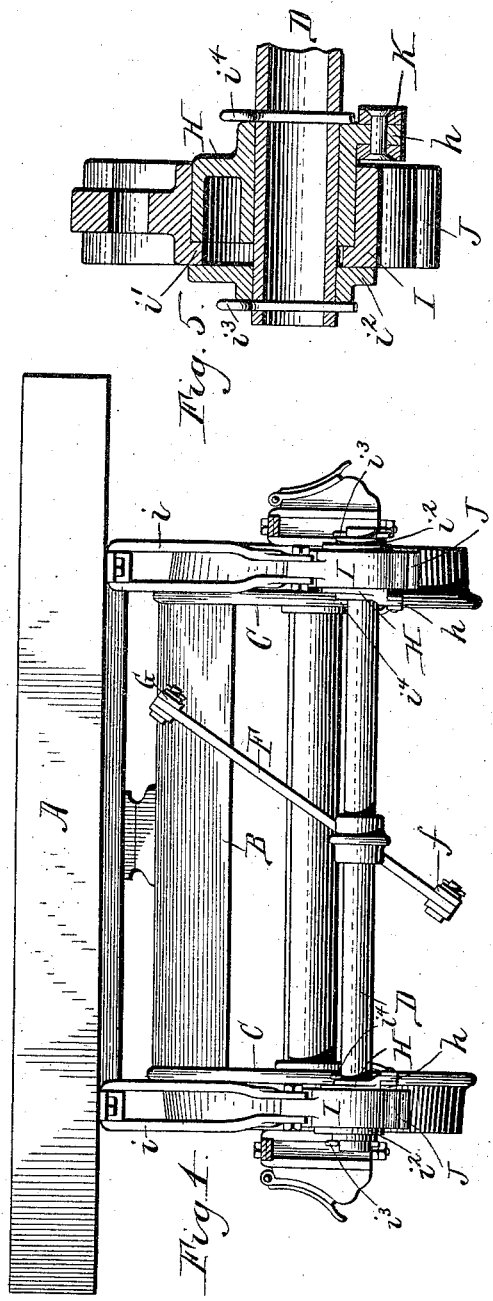
WITNESSES
Emil Neuhart
Chas. F. Burkhardt
James Howard   INVENTOR.
By Wilhelm Bonner   ATTORNEYS (No Model.) 3 Sheets—Sheet 3.

J. HOWARD.
CAR BRAKE ADJUSTER.

No. 537,574. Patented Apr. 16, 1895.

WITNESSES:
Emil Neuhart.
Chas. F. Burkhardt.

INVENTOR.
James Howard
By Wilhelm Bonner
ATTORNEYS.

UNITED STATES PATENT OFFICE.

JAMES HOWARD, OF NEW YORK, N. Y.

CAR-BRAKE ADJUSTER.

SPECIFICATION forming part of Letters Patent No. 537,574, dated April 16, 1895.

Application filed February 27, 1894. Serial No. 501,638. (No model.)

*To all whom it may concern:*

Be it known that I, JAMES HOWARD, a citizen of the United States, residing at New York, in the county of New York and State of New York, have invented a new and useful Improvement in Car-Brake Adjusters, of which the following is a specification.

This invention relates to automatic brake adjusters which take up the slack and wear in the brake gearing, and it has the object to produce an adjuster of this character which will take up the slack promptly and positively as the brake shoes wear away, without materially changing the angle of the brake levers or affecting the travel of the piston in the air cylinder.

Figure 1:
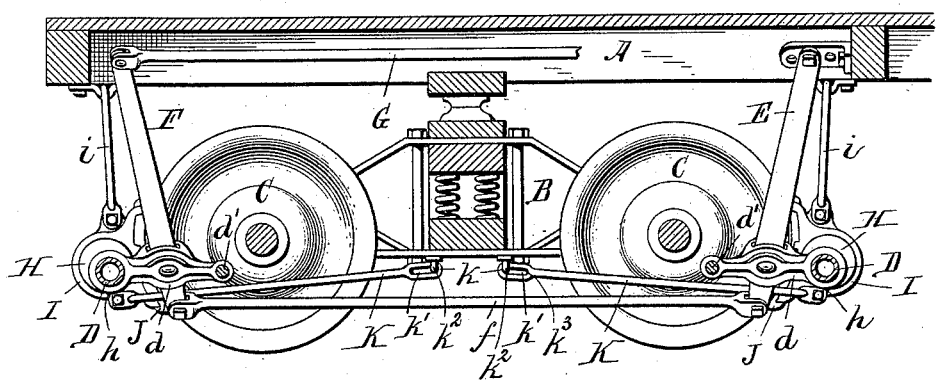
Figure 2:
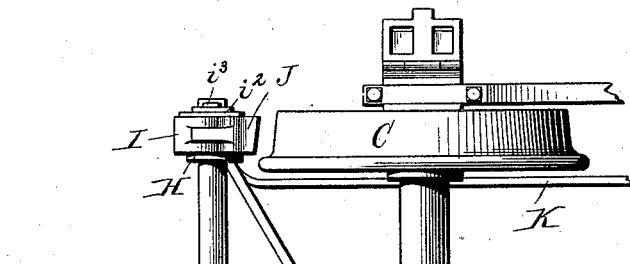
Figure 6:
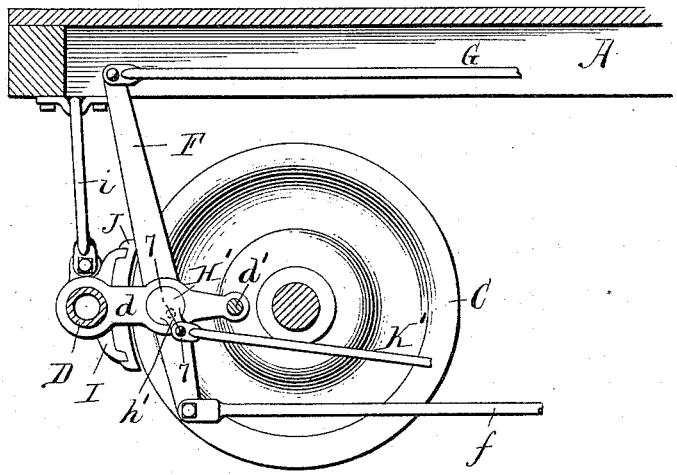
Figure 7:
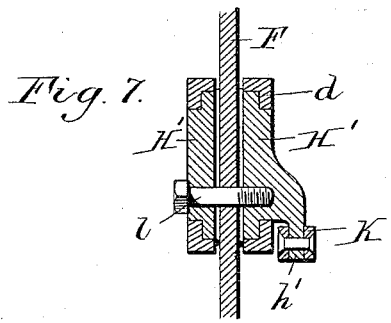
Figure 8:
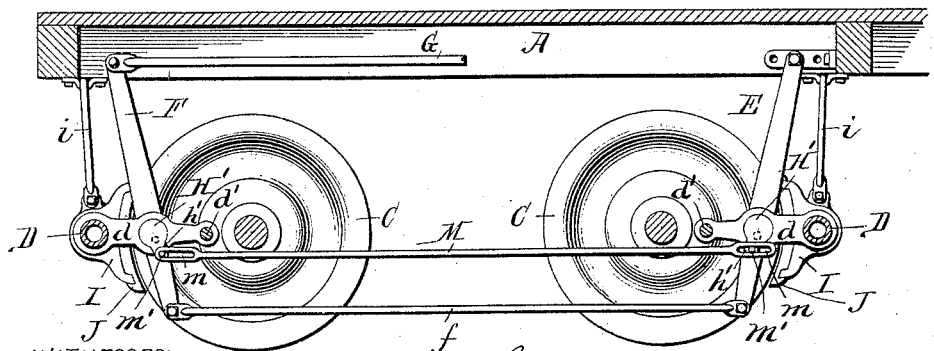

In the accompanying drawings consisting of three sheets: Figure 1 is a vertical longitudinal section of a car truck provided with my improved brake adjuster, the section being taken centrally through the truck. Fig. 2 is a fragmentary top plan view of the same, on an enlarged scale. Fig. 3 is a longitudinal section of the car truck, on an enlarged scale, the section being taken on a line adjacent to the inner side of the wheels and brake shoes. Fig. 4 is an end elevation of the same. Fig. 5 is a cross section on an enlarged scale in line 5—5, Fig. 3. Fig. 6 is a fragmentary longitudinal section of a car truck provided with a modified form of my improved brake adjuster. Fig. 7 is a vertical section, on an enlarged scale, in line 7—7, Fig. 6. Fig. 8 is a longitudinal section of a car truck, showing another modification of my invention.

Like letters of reference refer to like parts in the several figures.

Referring to Figs. 1 to 5, A represents the body of the car, B the truck and C the wheels.

D represents the brake beams which are preferably of tubular form, and provided centrally with a strut $d$ and an angular longitudinal truss $d'$.

E represents the dead brake lever which is pivoted with its upper end to the car body or truck and pivotally connected near its lower end to the central portion of the strut of one of the beams.

F represents the live brake lever which is pivoted near its lower end to the strut of the other brake beam and connected at its lower end with the lower end of the dead lever by a rod $f$.

G is the pull rod which connects the upper end of the live lever with the hand and air brake mechanism, whereby the brakes are applied to the wheels. This air brake mechanism is not shown in the drawings, and may be of any common construction.

H represents eccentric disks mounted on the end portions of the brake beam, so as to turn thereon. Each of these disks is provided with a depending radial arm $h'$.

I represents brake heads which are loosely suspended from the car body or the truck by links $i$, and which are mounted on the peripheries of the eccentric disks in such a manner as to permit the latter to turn in the circular opening formed in the brake heads for the reception of the disks.

As shown in Fig. 5, each brake head is provided on its outer side with an inwardly projecting flange $i'$ which bears against the adjacent side of the eccentric disk.

$i^2$ represents a collar arranged on the end of the brake beam and bearing against the outer side of the brake head, thereby confining the brake head against lateral movement on the eccentric disk. The latter is held against lateral movement on the brake beam by spring pins or keys $i^3$, $i^4$, passing through openings formed in the brake beam on the outer side of the collar and the inner side of the eccentric disk.

J represents the brake shoes which are detachably secured to the brake heads.

K represents shifting rods whereby the eccentric disks are turned on the brake beams for moving the brake heads and shoes toward the wheels. Each eccentric disk is provided with one of these rods, and the outer end of the rod is pivoted to the arm of the eccentric disk while its opposite end is formed with a longitudinal slot $k'$ which receives a stop pin $k^2$ secured to the truck or other part, which is stationary with reference to the eccentric disk.

Upon applying and releasing the brakes when the parts are in a normal condition, the brake shoes are moved against the wheel and removed therefrom, in the usual manner. The shifting rod of each eccentric disk takes part in these movements of the brake shoes, and rides with its slotted end on the stop pin $k^2$, but the slot of the rod is made so long that neither of its ends strikes against the pin, under these conditions. As the brake shoe becomes worn, the brake beam and connecting parts are moved forward a greater distance by the air cylinder and piston, to cause the shoe to bear against the wheel. This increased forward movement of the brake shoe causes the rear end $k^3$ of the slot in the shifting rod to strike the stop pin, thereby arresting the forward movement of said rod. As the outer end of the rod is now stationary, and the eccentric disk is free to rotate in the brake head, the continued forward movement of the brake shoe and connecting parts, causes the eccentric disk, by reason of its connection with the shifting rod, to be turned in the proper direction to move the brake shoe away from the brake beam and toward the wheel, thus compensating for the wear of the shoe. After the wear of the shoe has been taken up, the position of the shifting rod with reference to the brake beam remains undisturbed until the shoe again becomes worn, when the operation of taking up the slack is repeated. By this arrangement, the taking up of the slack is governed entirely by the wear upon the brake shoes and very slight wear of the shoes is taken up the instant it takes place, whereby changing of the angle of the levers in the brake gearing is avoided and a practically uniform travel of the piston in the air cylinder is maintained.

When the brake shoes are worn out they are removed and the brake beam is moved backward a sufficient distance to permit of applying the new shoes. During this backward movement of the brake beam, the rear end $k^4$ of the slot in the shifting rod strikes the stop pin $k^2$ and causes the eccentric disk to be turned in a reverse direction, thereby moving the brake head away from the wheel preparatory to receiving a new brake shoe.

In the modified construction shown in Figs. 6 and 7, eccentric disks H' are mounted in circular openings in the strut $d$ on opposite sides of the brake lever and connected by an eccentric pin $l$ upon which the brake lever F is pivoted. One of the disks H' is provided with a depending arm $h'$ which is connected to one end of a shifting rod K'. As the brake shoes wear, these eccentric disks are turned in the manner heretofore described, which causes the pivot of the brake lever to be shifted toward the brake beam and shoes, thus compensating for the wear of the shoes.

Instead of employing a separate shifting rod for each brake shoe, a single shifting rod M may be employed for each pair of shoes on the same side of the truck, as shown in Fig. 8. This shifting rod is provided at opposite ends with longitudinal slots $m$ which receive the pins $m'$ arranged on the radial arms of the eccentric disks. In this construction no stationary stop pins are employed on the truck, but the pins $m'$ act as stops for arresting the longitudinal movement of the shifting rod for rotating the disks.

I claim as my invention—

1. The combination with the brake shoe and a head or support connected with the brake shoe and having a circular opening, of an eccentric disk arranged to turn in said opening, and an actuating device connected with the eccentric disk, whereby the brake shoe is shifted with reference to the car wheel for taking up wear, substantially as set forth.

2. The combination with the brake beam and the brake shoe, of a rotary eccentric disk arranged between the brake beam and the shoe and adapted to be turned for moving the brake shoe away from the brake beam and taking up wear, substantially as set forth.

3. The combination with the brake beam, of a brake head provided with a circular opening, a rotary eccentric disk mounted on the brake beam and arranged to turn in the opening of the brake head, and a brake shoe connected with the brake head, substantially as set forth.

4. The combination with the brake beam, of an eccentric disk arranged to turn on the brake beam and provided with a shifting arm, a brake head mounted on said disk and carrying the brake shoe, a shifting rod connected at one end with the arm of the disk and provided in its other end with a longitudinal slot, and a stop pin arranged in said slot, substantially as set forth.

Witness my hand this 22d day of February, 1894.

JAMES HOWARD.

Witnesses:
JNO. J. BONNER,
ELLA R. DEAN.